United States Patent
Laube

(10) Patent No.: US 12,306,529 B2
(45) Date of Patent: May 20, 2025

(54) CAMERA SHUTTER WITH ADDITIONAL VIEW BLOCKERS

(71) Applicant: Biamp Systems, LLC, Beaverton, OR (US)

(72) Inventor: Douglas Laube, Plano, TX (US)

(73) Assignee: Biamp Systems, LLC, Beaverton, OR (US)

( * ) Notice: Subject to any disclaimer, the term of this patent is extended or adjusted under 35 U.S.C. 154(b) by 0 days.

(21) Appl. No.: 17/972,496

(22) Filed: Oct. 24, 2022

(65) Prior Publication Data

US 2023/0132130 A1 Apr. 27, 2023

Related U.S. Application Data

(60) Provisional application No. 63/271,448, filed on Oct. 25, 2021.

(51) Int. Cl.
*G03B 9/48* (2021.01)

(52) U.S. Cl.
CPC ..................................... *G03B 9/48* (2013.01)

(58) Field of Classification Search
CPC ... G03B 9/46; G03B 9/48; G03B 9/14; G03B 9/26; G03B 11/043
See application file for complete search history.

(56) References Cited

U.S. PATENT DOCUMENTS

| | | | |
|---|---|---|---|
| 2007/0110433 A1* | 5/2007 | Masahiko | G03B 9/14 396/469 |
| 2008/0050112 A1 | 2/2008 | Wernersson | |
| 2008/0205879 A1* | 8/2008 | Park | H04N 23/55 396/497 |
| 2009/0041447 A1 | 2/2009 | Kim et al. | |
| 2015/0093102 A1* | 4/2015 | Oguchi | G03B 11/043 396/435 |

OTHER PUBLICATIONS

International Search Report and Written Opinion issued in the PCT Application No. PCT/US22/47779, mailed on Jan. 31, 2023.

\* cited by examiner

*Primary Examiner* — Noam Reisner

(57) ABSTRACT

One example may include a camera with a camera lens, and two shutter portions on opposite sides of the camera lens affixed to pivoting axes, and two shutter arms affixed to the two shutter portions which rotate about the pivoting axes to move the two shutter portions together to be contiguous with one another in front of the camera lens.

3 Claims, 5 Drawing Sheets

200

CAMERA SHUTTER WITH ADDITIONAL VIEW BLOCKERS

TECHNICAL FIELD

This application generally relates to camera shutters and more specifically to a camera shutter with secondary view blockers.

BACKGROUND

Conventional cameras have few options to prevent undesired viewing. In computers and similar electronic devices, a camera may be embedded into a structure with a clear view of whatever is in front of the camera absent a user putting a cover over the camera, such as a piece of tape or other view blocking material.

In general, any camera that is linked to a computer could start recording at any time during the computer's operation. An application that is unknown to a user or was not properly disengaged after a recording session may enable undesired video to be captured and recorded.

SUMMARY

One example embodiment may provide an apparatus that includes one or more of a camera including a camera lens, and two shutter portions on opposite sides of the camera lens affixed to pivoting axes, and two shutter arms affixed to the two shutter portions which rotate about the pivoting axes to move the two shutter portions together to be contiguous with one another in front of the camera lens.

Another example embodiment may include a method that includes receiving a command, via a processor, to close a plurality of shutters, actuating one or more motors to move one or more shutter arms affixed to the plurality of shutters, and stopping the shutter arms movement when the shutters are contiguous.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
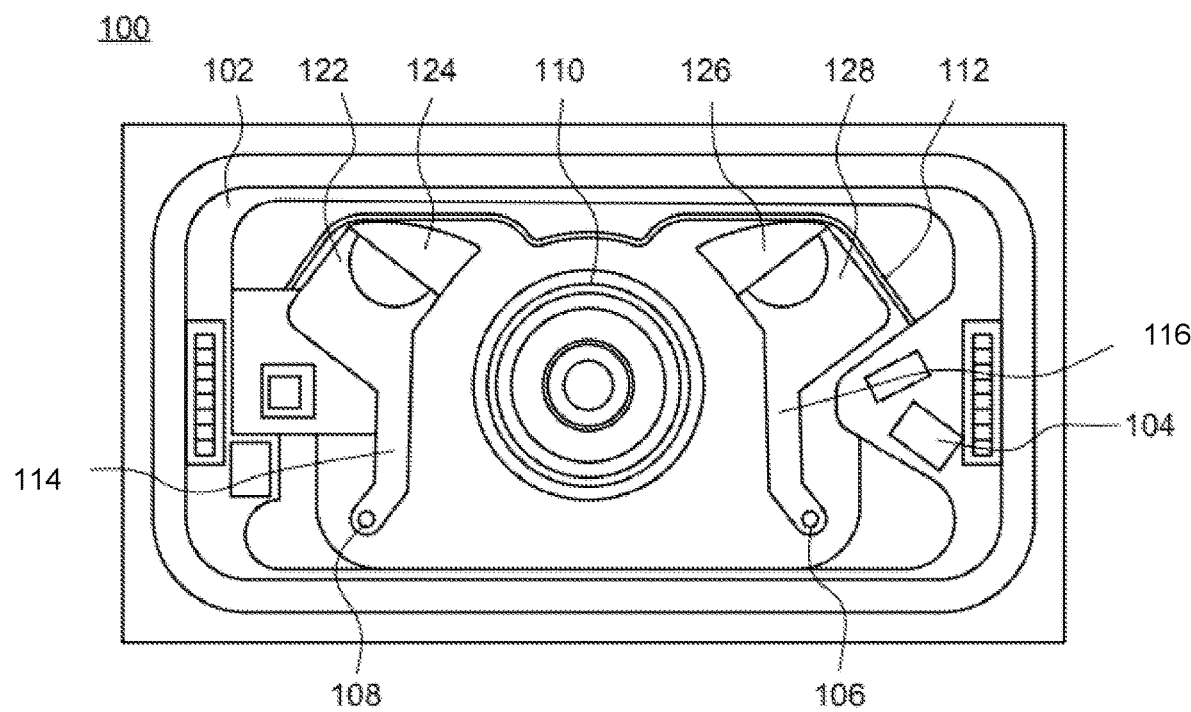
FIG. 1 illustrates a camera shutter configuration in an open position according to example embodiments.

FIG. 1 illustrates a camera shutter configuration 100 in an open position according to example embodiments. Referring to FIG. 1, the camera housing and shutter are depicted in an open shutter position. The housing and shutter are integrated in a printed circuit board (PCB) device 102, which may include a processor, memory, battery, bus, and other electrical components coupled to one another, as well as a communication element, such as a transceiver that is capable of receiving and/or transmitting a signal to and from the device directly, via an actuator, button, or command, including an electronic command or a voice command, or via another device, such as a remote control or other unit communicably coupled to the camera configuration. The camera 110 may have various lenses and/or other components (not shown) and may be placed below a level of a shutter plane where the shutters meet to block the camera view.

In this example, the shutters include two arms 114 and 116 that are configured to be opened approximately 90 degrees, however, the rotation angle about the pivoting axes 106 and 108 may be less or more than 90, such as between 60 and 120 degrees. The shutter configuration includes each arm having two main segments. The first segment is the relatively square-shaped portion 122 which may include an ornamental semicircular design, and a relatively triangular portion 124 connected to the predominantly square shaped portion. The other shutter has a similar configuration with a square portion 128 and triangular portion 126. However, it is important to note that the two shutters do operate in two different ways since one triangular portion, either 124 or 126 will be lower than the other so they can both be pressed towards one another while the shutters are closing and not crash/block into one another, in other words, one triangular portion 126 or 128 will be behind the other when the shutters are in a closed position and the square portions 122 and 128 are flush and contiguous against one another in the closed position. Both the triangular portions are lower in depth than the square portions, and may be a thinner material than the square portions. As mentioned previously, one of the triangular portions 124/126 will be lower in the depth than the other triangular portion 124/126 so they do not collide when the shutters close. Which of the two triangular portions is lower than the other is optional. The measurements of difference between the depths of the triangular portions will be minor, however, for example purposes, the depth between the surface of the square shutter portion 128 and the (higher) triangular portion 126 may be approximately 0.3 mm, and the depth between the surface of the square shutter portion 122 and the lower triangular portion 124 may be approximately 0.6 mm. The distances of the depths may vary as one skilled in the art could appreciate. Also, there may be a sleeve or pocket in the square shutter portion 122 that permits the (higher) triangular portion 126 to fit inside of pocket area while the (lower) triangular portion 124 rests behind the square portion 128. Alternatively, the triangular shaped portions 124 and 126 may not be attached to the square portions and may overlap independently behind the square portions in a closed position. In this example, there may be a gap between the square portions 122/128 and where the triangular portions 124/126 begin. The triangular portions 124/126 may be attached to the square portions or may be free from the square portions.

The shutter plane area may include a butterfly shaped rim 112 that outlines the entire area defined by the shutters, the pivoting axes, the shutter arms and the camera lens. The triangular shaped portions are generally in the shape of ninety-degree right angle triangles, however, they may include curved edges. Each segment is coupled to the arms and rotating axes so the arms can open or close when the camera shutter is opened or closed.

Each semicircular design (ornamental appearance) is an opposite of the other such that when the camera shutter is closed, both arms move inward covering the camera lens with each semicircle meeting to form a nearly full circle with a slight "perforation" or "seam" where the predominantly square shaped portions meet. When the camera shutter is closed, the predominantly triangular shaped portions overlap one another as one sits or is positioned lower than the other to ensure there is a complete covering of the camera lens(s) and there is enough rigidity to keep the shutter closed, in place.

Figure 2A:
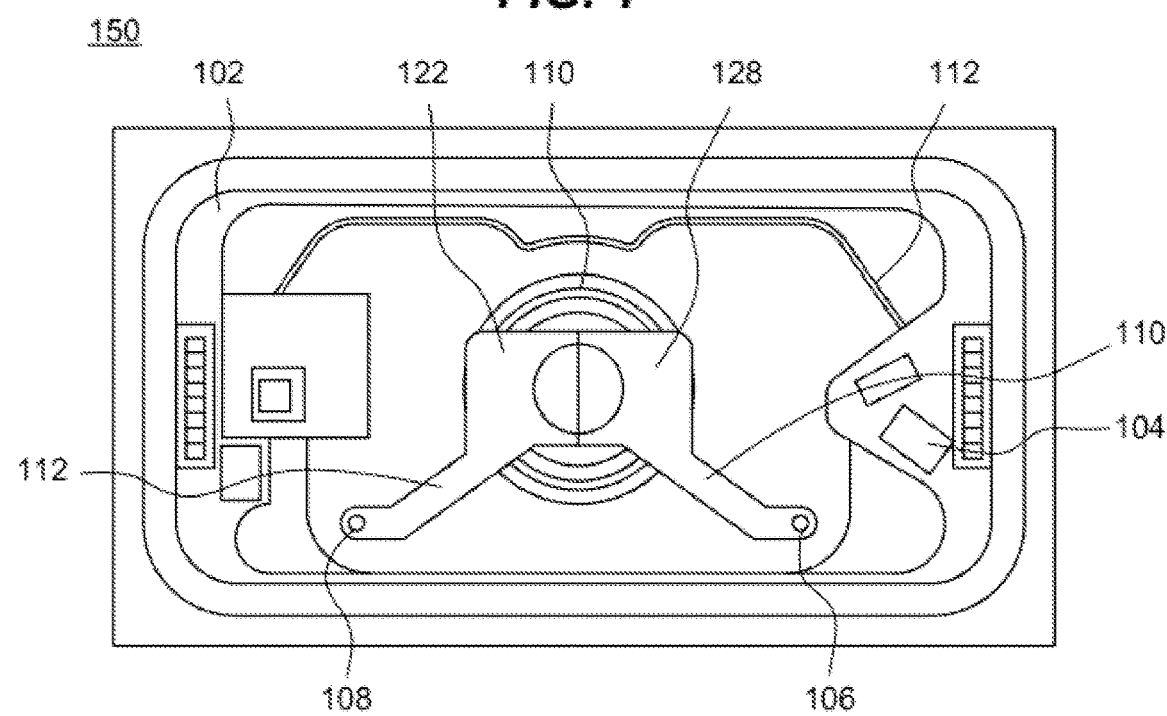
FIG. 2A illustrates a camera shutter configuration in a closed position according to example embodiments.

FIG. 2A illustrates a camera shutter configuration in a closed position according to example embodiments. Referring to FIG. 2A, the example 150 demonstrates the shutters in a closed position with the square portions 122 and 128 meeting in a contiguous arrangement. The triangular portions behind the shutters are overlapping and provide a secondary blocking mechanism to ensure the camera lens cannot capture undesired content. The pivoting axes 108 and 106 are controlled by a motor, a power source and a control signal sent from a bus or signal line attached to a control interface 104.

Figure 2B:
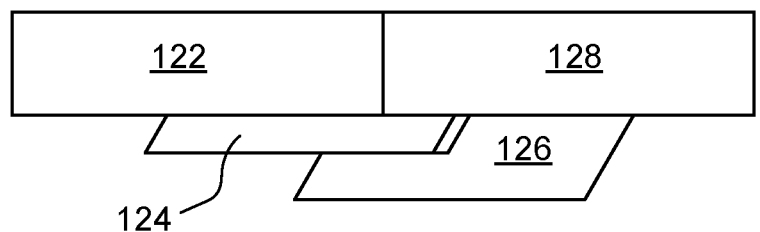
FIG. 2B illustrates the side view of the camera shutters in a closed position with the triangular portions overlapping according to example embodiments.

FIG. 2B illustrates the side view of the camera shutters in a closed position with the triangular portions overlapping according to example embodiments. Referring to FIG. 2B, the camera shutters are in a closed position and the main square/rectangular portions are contiguous with one another. The triangular portions are overlapping with one another and one of them 124 is lower than the planar area of the main shutters 122 and 128 and the other 126 is below a planar area of the shutters 122 and 128 and the other triangular portion 124.

Figure 3A:
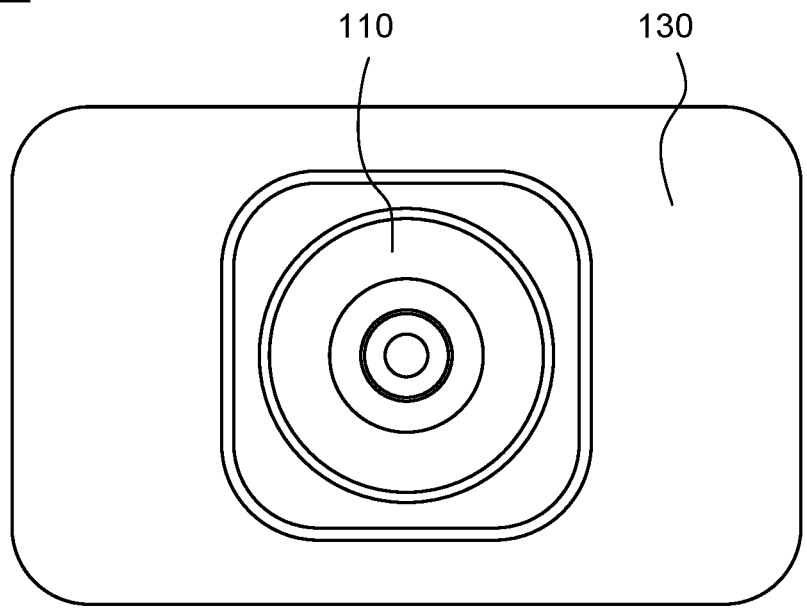
FIG. 3A illustrates a camera installed inside a protective layer without the shutter blocking the camera view according to example embodiments.

FIG. 3A illustrates a camera installed inside a protective layer without the shutter blocking the camera view according to example embodiments. Referring to FIG. 3A, the example 160 demonstrates how the camera is set behind a clear frame of plastic or glass 130 in an open position.

Figure 3B:
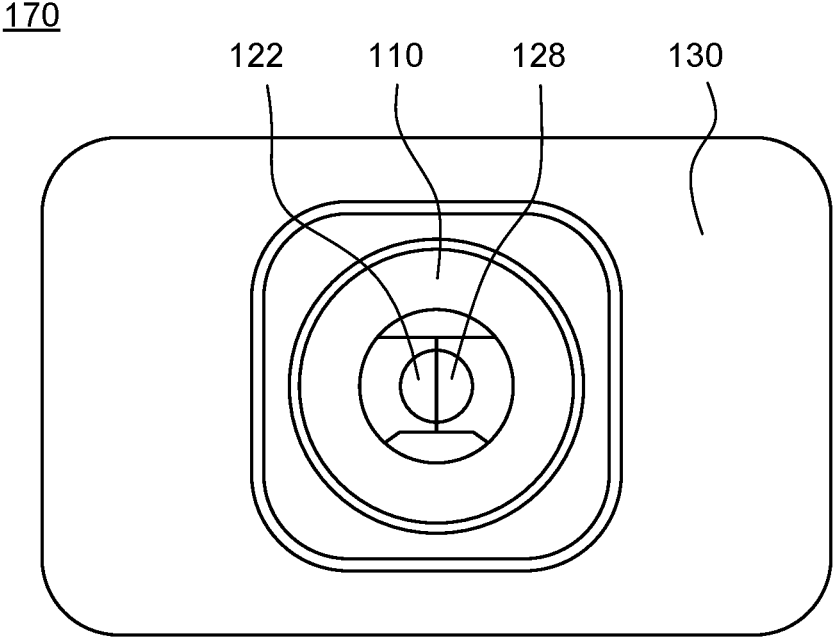
FIG. 3B illustrates a camera installed inside a protective layer with the shutter blocking the camera view according to example embodiments.

FIG. 3B illustrates a camera installed inside a protective layer with the shutter blocking the camera view according to example embodiments. Referring to FIG. 3B, the example 170 includes the camera being set behind the glass or plastic frame of material and the lens is covered by the shutters which are in a closed position.

One example apparatus may include a camera with a camera lens, and two shutter portions on opposite sides of the camera lens affixed to pivoting axes, and the two shutter arms affixed to the two shutter portions rotate about the pivoting axes to move the two shutter portions together to be contiguous with one another in front of the camera lens. Each of the two shutter portions has a main square or rectangular shape portion and respective triangular shaped portions recessed below a surface area of the square or rectangular shaped portion. A first of the triangular shaped portions is recessed a lower distance with respect to a surface area of the attached first square or rectangular shaped portion than a second of the triangular shaped portions with respect to a surface area of the second attached square or rectangular shaped portion. In a closed position, the two shutter portions are contiguous with one another and the two triangular shaped portions are overlapping with one another such that one of the triangular shaped portions is beneath the other triangular shaped portions.

Figure 4:
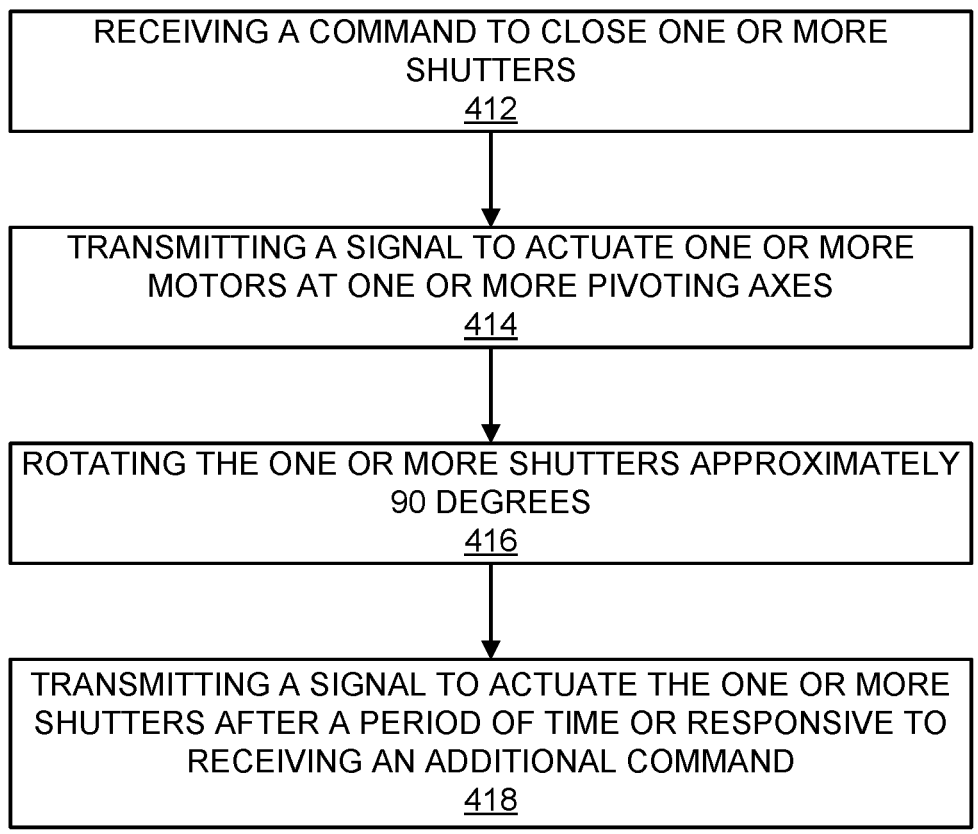
FIG. 4 illustrates an example method of operation according to example embodiments.

FIG. 4 illustrates an example method of operation according to example embodiments. Referring to FIG. 4, the example method may include receiving a command to close one or more shutters 412, the command may be sent from an application, a voice command detected by a voice recognition application or via a button on the user device. The processor of the computing device attached to the camera or affixed to the camera by wired or wireless mediums may send a signal 414 to actuate the motors or mechanical switches attached to each shutter arm to pivot about the axes and move the shutters to a closed and contiguous position. The rotation may occur 416 about the axis and may be about 90 degrees. The shutters may reopen and move back to a starting position after a period of time 418. The change in position may occur after another command is received or after a period of time or both.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art. The computer and computer program may be enabled to control the camera, the shutter and any other related component of such a system.

Figure 5:
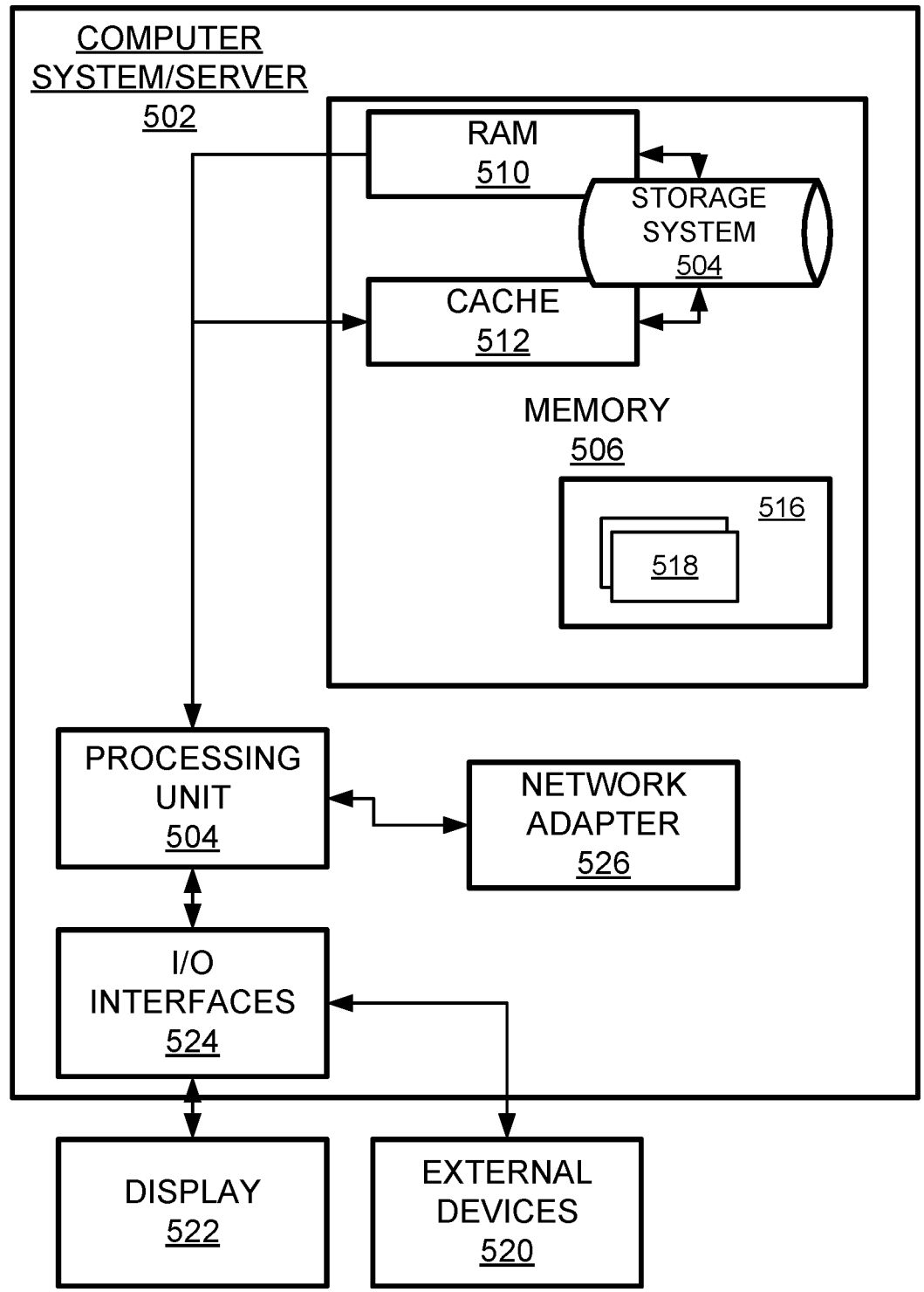
FIG. 5 illustrates a computer system configuration configured to operate the camera according to example embodiments.

FIG. 5 is not intended to suggest any limitation as to the scope of use or functionality of embodiments of the application described herein. Regardless, the computing node 500 is capable of being implemented and/or performing any of the functionality set forth hereinabove.

In computing node 500 there is a computer system/server 502, which is operational with numerous other general purpose or special purpose computing system environments or configurations. Examples of well-known computing systems, environments, and/or configurations that may be suitable for use with computer system/server 502 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 502 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 502 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 5, computer system/server 502 in cloud computing node 500 is displayed in the form of a general-purpose computing device. The components of computer system/server 502 may include, but are not limited to, one or more processors or processing units 504, a system memory 506, and a bus that couples various system components including system memory 506 to processor 504.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 502 typically includes a variety of computer system readable media. Such media may be any available media that is accessible by computer system/server 502, and it includes both volatile and non-volatile media, removable and non-removable media. System memory 506, in one embodiment, implements the flow diagrams of the other figures. The system memory 506 can include computer system readable media in the form of volatile memory, such as random-access memory (RAM) 510 and/or cache memory 512. Computer system/server 502 may further include other removable/non-removable, volatile/non-volatile computer system storage media. By way of example only, storage system 514 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 506 may include at least one program product having a set (e.g., at least one) of program modules that are configured to carry out the functions of various embodiments of the application.

Program/utility 516, having a set (at least one) of program modules 518, may be stored in memory 506 by way of example, and not limitation, as well as an operating system, one or more application programs, other program modules, and program data. Each of the operating system, one or more application programs, other program modules, and program data or some combination thereof, may include an implementation of a networking environment. Program modules 518 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 502 may also communicate with one or more external devices 520 such as a keyboard, a pointing device, a display 522, etc.; one or more devices that enable a user to interact with computer system/server 502; and/or any devices (e.g., network card, modem, etc.) that enable computer system/server 502 to communicate with one or more other computing devices. Such communication can occur via I/O interfaces 524. Still yet, computer system/server 502 can communicate with one or more networks such as a local area network (LAN), a general wide area network (WAN), and/or a public network (e.g., the Internet) via network adapter 526. As depicted, network adapter 526 communicates with the other components of computer system/server 502 via a bus. It should be understood that although not displayed, other hardware and/or software components could be used in conjunction with computer system/server 502. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A camera comprising:
   a camera lens; and a shutter mechanism comprising:
   two shutter portions respectively located on opposite sides of the camera lens and affixed to pivoting axes, wherein the two shutter portions rotate about the pivoting axes to arcuately move the two shutter portions together to be contiguous with one another in front of the camera lens in a closed position,
   wherein a first shutter portion of the two shutter portions comprises a first main rectangular portion and a first triangular-shaped portion having a top surface affixed to a first bottom surface of the first main rectangular portion so that the first triangular-shaped portion is located below a plane of the first bottom surface,
   wherein a second shutter portion of the two shutter portions comprises a second main rectangular portion and a second triangular-shaped portion affixed to a second bottom surface of the second main rectangular portion so that the second triangular-shaped portion is located below a plane of the second bottom surface,
   wherein in the closed position, the first main rectangular portion and the second main rectangular portion are contiguous and form a vertical gap therebetween, the first bottom surface and the second bottom surface are coplanar, and the second triangular-shaped portion overlaps a bottom surface of the first triangular-shaped portion to cover the vertical gap.

2. A method comprising:
   receiving by a processor a command to close two shutters of a camera,
   wherein the two shutters are located on opposite sides of a camera lens and affixed to pivoting axes,
   wherein a first shutter portion of the two shutters comprises a first main rectangular portion and a first triangular-shaped portion having a top surface affixed to a first bottom surface of the first main rectangular portion so that the first triangular-shaped portion is located below a plane of the first bottom surface, and
   wherein a second shutter portion of the two shutter portions comprises a second main rectangular portion and a second triangular-shaped portion affixed to a second bottom surface of the second main rectangular portion so that the second triangular-shaped portion is located below a plane of the second bottom surface;
   actuating one or more motors to arcuately move the two shutters via the pivoting axes; and
   stopping a movement of the two shutters when the first main rectangular portion and the second main rectangular portion are contiguous and form a vertical gap therebetween, the first bottom surface and the second bottom surface are coplanar, and the second triangular-shaped portion overlaps a bottom surface of the first triangular-shaped portion portions overlap one another to cover the vertical gap.

3. The method of claim 2, wherein the two shutters are moved back to an open position after a period of time is identified by the processor.

* * * * *